United States Patent
Tarandek et al.

(10) Patent No.: US 12,472,918 B2
(45) Date of Patent: Nov. 18, 2025

(54) BRAKE SYSTEM

(71) Applicant: HL MANDO CORPORATION, Gyeonggi-do (KR)

(72) Inventors: Kristijan Tarandek, Neu-Isenburg (DE); Hans Joerg Feigel, Rosbach (DE); Josko Kurbasa, Waldsolms (DE); Rachid Bouzid, Frankfurt am Main (DE); Ralf Leiter, Mendig (DE)

(73) Assignee: HL MANDO CORPORATION, Gyeonggi-do (KR)

( * ) Notice: Subject to any disclaimer, the term of this patent is extended or adjusted under 35 U.S.C. 154(b) by 478 days.

(21) Appl. No.: 17/599,825

(22) PCT Filed: Mar. 27, 2020

(86) PCT No.: PCT/KR2020/004275
§ 371 (c)(1),
(2) Date: Sep. 29, 2021

(87) PCT Pub. No.: WO2020/204509
PCT Pub. Date: Oct. 8, 2020

(65) Prior Publication Data
US 2022/0194344 A1  Jun. 23, 2022

(30) Foreign Application Priority Data

Mar. 29, 2019  (DE) .......................... 102019204524.3
Nov. 20, 2019  (DE) .......................... 102019217925.8

(51) Int. Cl.
*B60T 13/74*  (2006.01)
*B60T 8/17*  (2006.01)
(Continued)

(52) U.S. Cl.
CPC .............. *B60T 13/741* (2013.01); *B60T 8/17* (2013.01); *B60T 13/588* (2013.01);
(Continued)

(58) Field of Classification Search
CPC .......... B60T 8/17; B60T 17/22; B60T 13/588; B60T 13/741; B60T 13/662;
(Continued)

(56) References Cited

U.S. PATENT DOCUMENTS 6,317,675 B1  11/2001  Stölzl et al.
6,410,993 B1*  6/2002  Giers ...................... B60T 8/321
                                                         303/20

(Continued)

FOREIGN PATENT DOCUMENTS

CN  101479136  7/2009
CN  201998976  10/2011
(Continued)

OTHER PUBLICATIONS

Translation of DE 3502100 C2 (Year: 1996).*
(Continued)

*Primary Examiner* — Thomas J Williams
(74) *Attorney, Agent, or Firm* — WOMBLE BOND DICKINSON (US) LLP (57) ABSTRACT

The invention relates to a brake system including at least one brake with an electric brake actuator, at least one electronic control unit for controlling the at least one electric brake, and two different power supply units connected to the at least one electronic control unit and configured for supplying energy to the at least one electric brake actuator. The at least one electronic control unit comprises a first brake actuation system for activating the electric brake actuator and a redundant brake actuation system for activating the electric brake actuator in case of a failure of the first brake actuation system. The invention also relates to a method for using the brake system.

13 Claims, 8 Drawing Sheets

(51) Int. Cl.
*B60T 13/58* (2006.01)
*B60T 13/66* (2006.01)
*B60T 17/22* (2006.01)

(52) U.S. Cl.
CPC ............ *B60T 13/662* (2013.01); *B60T 17/22* (2013.01); *B60T 2270/402* (2013.01); *B60T 2270/413* (2013.01); *B60T 2270/414* (2013.01)

(58) Field of Classification Search
CPC ......... B60T 2270/402; B60T 2270/413; B60T 2270/414
See application file for complete search history.

(56) References Cited

U.S. PATENT DOCUMENTS

| | | | | |
|---|---|---|---|---|
| 7,359,786 | B2* | 4/2008 | Lindqvist | B60T 17/22 |
| | | | | 701/32.7 |
| 7,396,088 | B2* | 7/2008 | Nilsson | B60T 13/74 |
| | | | | 303/122.04 |
| 7,837,278 | B2* | 11/2010 | Nilsson | B60T 8/345 |
| | | | | 188/158 |
| 7,866,761 | B2 | 1/2011 | Gerum et al. | |
| 8,219,289 | B2* | 7/2012 | Kamada | F16H 61/12 |
| | | | | 477/80 |
| 8,412,422 | B2* | 4/2013 | Kamada | F16H 63/483 |
| | | | | 477/80 |
| 8,447,487 | B2* | 5/2013 | Nishino | B60T 8/885 |
| | | | | 701/78 |
| 9,873,414 | B2 | 1/2018 | Förster et al. | |
| 10,081,345 | B2 | 9/2018 | Masuda | |
| 10,597,015 | B2* | 3/2020 | Mizusaki | H02J 7/342 |
| 2006/0108867 | A1* | 5/2006 | Ralea | B60T 8/1703 |
| | | | | 303/152 |
| 2009/0079259 | A1 | 3/2009 | Iwasaki et al. | |
| 2013/0282249 | A1 | 10/2013 | Heise et al. | |
| 2017/0072920 | A1 | 3/2017 | Besier et al. | |
| 2019/0061727 | A1* | 2/2019 | Mizusaki | B60T 8/172 |
| 2022/0194344 | A1* | 6/2022 | Tarandek | B60T 13/741 |

FOREIGN PATENT DOCUMENTS

| | | | |
|---|---|---|---|
| CN | 2016-210267 | 12/2016 | |
| DE | 3502100 C2 * | 4/1996 | ............. B60T 13/74 |
| DE | 19758289 A1 * | 7/1999 | ............. B60T 13/74 |
| DE | 10 2016 015 544 | 6/2018 | |
| EP | 1 758 778 | 3/2007 | |
| EP | 3 339 119 | 6/2018 | |
| EP | 3741635 A1 * | 11/2020 | .......... B60W 50/029 |
| GB | 2547506 A * | 8/2017 | ............ B60T 13/662 |
| JP | 2016-210267 | 12/2016 | |
| KR | 10-2012-0000840 | 1/2012 | |
| KR | 10-2012-0060394 | 6/2012 | |
| KR | 10-2017-0100042 | 9/2017 | |

OTHER PUBLICATIONS

Office Action dated Sep. 28, 2023 for Chinese Patent Application No. 202080025759.9 and its English translation from Global Dossier.
International Search Report for PCT/KR2020/004275 mailed on Jul. 23, 2020 (now published as WO 2020/204509).
Written Opinion of the International Searching Authority for PCT/KR2020/004275 mailed on Jul. 23, 2020 (now published as WO 2020/204509).
Office Action for European Patent Application No. 20785329.2 issued on Nov. 23, 2022.

* cited by examiner

BRAKE SYSTEM

CROSS-REFERENCE TO RELATED APPLICATIONS

This application is the national stage of International Application No. PCT/KR2020/004275, filed on Mar. 27, 2020, which claims priority, under 35 U.S.C. 119(a), to German Patent Application No. 102019204524.3 filed in Germany on Mar. 29, 2019, and German Patent Application No. 102019217925.8 filed in Germany on Nov. 20, 2019, the disclosures of which are incorporated by reference herein in their entireties.

The invention relates to a brake system including at least one brake with an electric brake actuator.

Brake systems of this kind are sometimes referred to as electro-mechanical brakes and may be used, for example, as parking brakes. A disadvantage of known brake systems of this type is the risk that they may fail completely if only one of several components fails.

Thus, it is an object of the invention to provide an improved electro-mechanical brake system with increased safety in view of possible failures.

This object is achieved by a brake system according to some embodiments of the present disclosure. Correspondingly, braking safety may be increased by a method according to certain embodiments of the present disclosure. Advantageous embodiments and optional features are defined by the dependent claims and can be found in the description and the Figures.

A brake system according to the invention includes at least one brake with an electric brake actuator, such as a motor, at least one electronic control unit for controlling the at least one brake, a first power supply unit and a second or redundant power supply unit. The first power supply unit and the redundant power supply unit are connected to or integrated in the at least one electronic control unit and configured for supplying energy to the at least one electric brake actuator. According to the invention, the at least one electronic control unit comprises, in addition to a first brake actuation system (which may also be referred to as first brake modulation system) for activating the electric brake actuator, a redundant brake actuation system (which may also be referred to as redundant brake modulation system) for activating the electric brake actuator in case of a failure of the first brake actuation system. This implies that the brake may autonomously be activated by the redundant brake actuation system, which improves safety.

The at least one brake could be or comprise a service brake. In typical embodiments, however, the at least one brake is or comprises a parking brake and the electric brake actuator is a parking brake actuator. Thus, the suggested brake system may be or comprise a redundant parking brake system (RPBS). The at least one brake may further comprise a hydraulic brake actuator for activating a service brake function of the at least one brake. The first brake actuation system may, in particular, be part of a control unit of a usual integrated dynamic brake (IDB) and may also be referred to as integrated brake actuation system. If the brake is or comprises a parking brake and if the electric brake actuator is a parking brake actuator, a park pawl or a parking lock may be dispensed with due to the redundant brake actuation system. This helps saving costs.

The first power supply unit is connected to the first brake actuation system for supplying energy to the first brake actuation system and via the first brake actuation system to the at least one electric brake actuator, while the redundant power supply unit is connected to or integrated in the redundant brake actuation system for supplying energy to the redundant brake actuation system and via the redundant brake actuation system to the at least one electric brake actuator.

Typically, the first power supply unit is a battery. The redundant power supply unit may, for example, be a supercapacitor or a further, typically much smaller battery. In any case, the redundant power supply unit is or comprise an energy storage. The weight and volume of the brake system can advantageously be reduced by keeping the capacity of this energy storage smaller than an energy storage capacity of the first power supply unit. Normally, it will be sufficient if the capacity of the energy storage of the redundant power supply unit is less than 50% of the energy storage capacity of the first power supply unit or even much smaller. This is possible as the redundant power supply is not needed for more than one or a limited number of brake actions or brake release actions.

A failure of the first brake actuation system to be compensated for may, in particular, be a failure of the first power supply unit. In that case, the redundant power supply unit may supply energy to the at least one electric brake actuator. For many purposes, it will be sufficient if that energy is enough for activating and/or releasing the brake only once. This can be achieved in a particularly cost efficient way if the redundant power supply unit is a supercapacity. In particular embodiments, the first power supply unit may be connected to the second or redundant power supply unit for charging the second power supply unit. This may be advantageous, in particular, if the redundant power supply unit is a supercapacitor.

In particular embodiments, the redundant brake actuation system comprises a switching element connected to the electric brake actuator of the at least one brake, the switching element being connected for alternatively connecting the electric brake actuator either to the first brake actuation system or to a brake actuation circuit of the redundant brake actuation system, so that the first brake actuation system may be connected to the electric brake actuator via the redundant brake actuation system in a normal operating state while the brake actuation circuit of the redundant brake actuation system may be connected to the electric brake actuator for activating the electric brake actuator in case of a failure of the first brake actuation system. In this case, a usual brake system including the at least one brake and the first (and, in the prior art, normally only) brake actuation system may be supplemented with the redundant brake actuation system (and, as the case may be, the redundant power supply unit) to form a brake system of the type described here without any need of modifying the electric brake actuator or the first brake actuation system.

In alternative embodiments, the at least one brake may have two input connectors and the at least one electronic control unit may have at least two connectors, wherein each of the two input connectors is connected to, in each case, one of the at least two connectors of the at least one electronic control unit, the at least one brake being configured to be supplied via either of the two connectors, independently. In this case, the first brake actuation system may have a first of the at least two connectors, which is connected to a first of the two input connectors, the redundant brake actuation system having a second of the at least two connectors, which is connected to a second of the two input connectors. The electric actuator may be a motor having two independent windings. In this case, each of the two input connectors may be connected to one of the two windings of the electric motor so that each of the windings is connected to one of the input connectors.

The first brake actuation system and the redundant brake actuation system may be arranged in one common housing or in separate housings.

Typically, the at least one brake is a disc brake comprising a calliper, the electric brake actuator being designed as a motor on calliper unit (MoC).

The brake system may be configured for self-testing the first brake actuation system and/or the first power supply unit and for activating the redundant brake actuation system or the brake actuation circuit of the redundant brake actuation system when a failure of the first brake actuation system is detected or when a failure of the first power supply unit is detected. Herein, an additional condition for activating the brake by the redundant brake actuation system may be defined as a condition indicating a need of a parking brake action or of a release of a parking brake.

In a method for using the brake system described here above, a parking brake function or a service brake function may be controlled either by a driver or by an automated vehicle management system.

The brake system and the method may have advantages with regard to one or more of
- fulfilling a necessary level of reliability for realization of a parking function,
- guaranteeing a halting function of the car without any additional measure,
- replacing an additional locking device like a park pawl in power train and/or transmission path,
- enabling use in any kind of passenger vehicles by adding a temporary electrical energy supply
- avoiding dead vehicle by redundancy to release parking brake in case of CCF,
- avoiding slope parking brake degradation in case of CCF.

The at least one brake or the brake system can optionally have some or all of the features of the brake system as described in German Patent Application 10 2019 204 035.7 filed on Mar. 25, 2019, in particular the features described in the claims and/or shown in FIGS. 1 to 5 of the above-mentioned Patent Application.

Exemplary embodiments of the brake system are shown in the Figures and explained here below in more detail.

Figure 1:
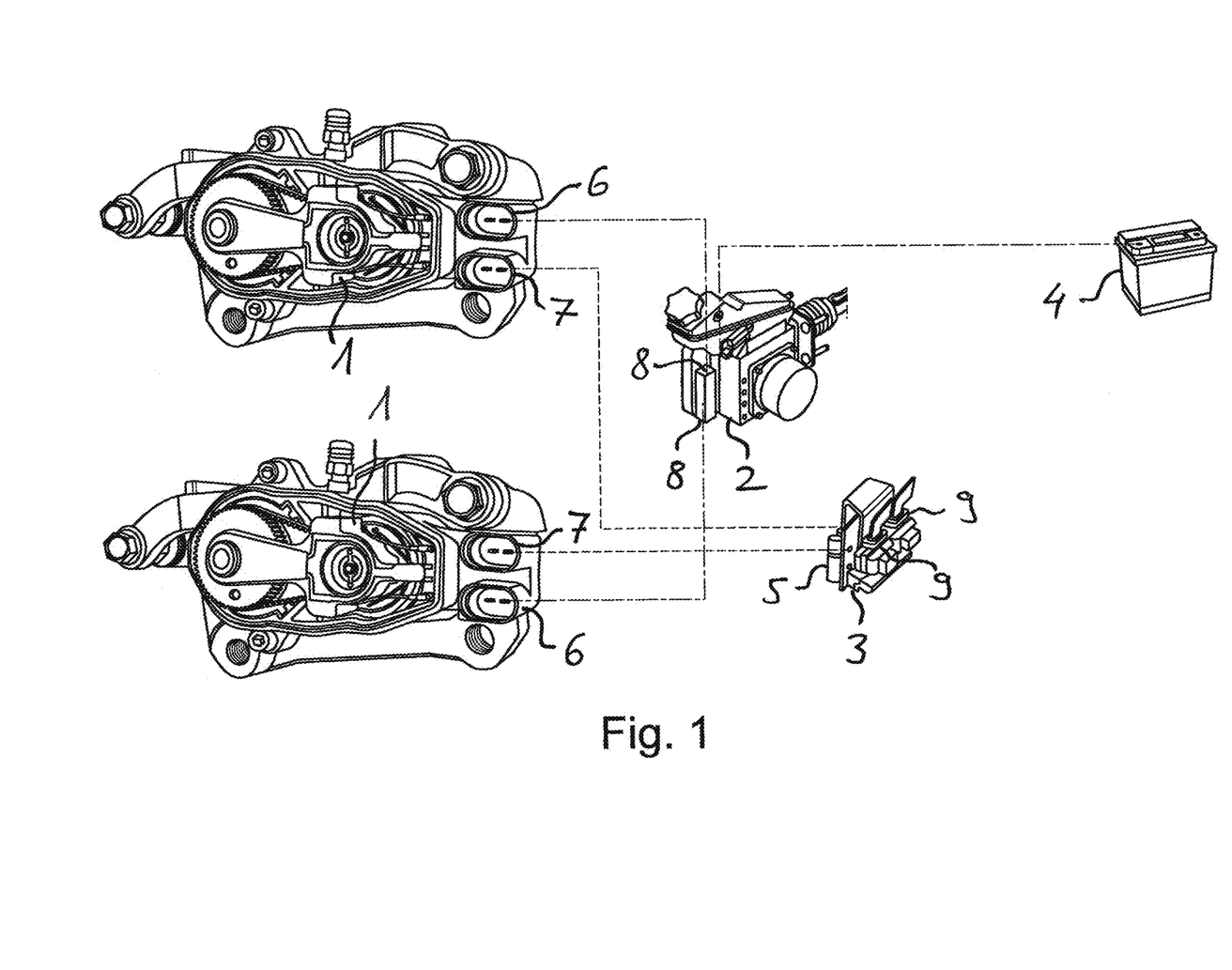
FIG. 1 schematically shows a redundant parking brake system (RPBS)

FIG. 1 shows some components of a brake system including a so-called redundant parking brake system (RPBS) with an electro-mechanical parking brake. In addition to the electro-mechanical parking brake, the brake system may comprise a hydraulic service brake. The parking brake uses two rear wheel brakes, each of the rear wheel brakes having an electric brake actuator 1. Furthermore, the brake system comprises a first electronic control unit 2 and a second electronic control unit 3 for controlling the two rear wheel brakes. The first electronic control unit 2 is part of an integrated brake modulation/actuation system and comprises a first brake actuation system for activating the electric brake actuators 1. The second electronic control unit 3 is a so-called redundant parking brake control and supply unit (RPBCSU) and comprises a redundant brake actuation system for activating the electric brake actuators 1 in case of a failure of the first brake actuation system. A first power supply unit 4, which is a usual car battery, is connected to the first electronic control unit 2 and configured for supplying energy to the electric brake actuators 1. To be more precise, the first power supply unit 4 connected to the first brake actuation system for supplying energy to the first brake actuation system and via the first brake actuation system to the electric brake actuators 1. A redundant power supply unit 5, which is a supercapacitor or a cluster of supercapacitors for a temporary energy supply, is integrated in the second control unit 3 and electrically connected to the redundant brake actuation system for supplying energy to the redundant brake actuation system and via the redundant brake actuation system to the electric brake actuators 1. Instead of a supercapacitor, the redundant power supply unit 5 could also be a different type of energy storage, such as a smaller battery. In any case, it has a much smaller energy storage capacity than the first power supply unit 4, typically a capacity of not more than 10% of a capacity of the first power supply unit 4. This is enough, in particular, for storing sufficient electrical energy for at least a couple of minutes or half an hour of standby operation of the redundant brake actuation system using the redundant power supply unit 5.

In the present embodiment the first brake actuation system and the redundant brake actuation system are arranged separate housings, one for each of the first and second electronic control units 2 and 3. In alternative embodiments, the first brake actuation system and the redundant brake actuation system could also be arranged in one common housing, either by arranging the two electronic control units 2 and 3 in a single housing or by designing the first brake actuation system and the redundant brake actuation system as two independent components of a single electronic control unit.

As can be seen in FIG. 1, each of the two rear wheel brakes has a first input connectors 6 and a second input connector 7, the first electronic control unit 2 having a connector 8 corresponding to each of the first input connectors 6 of the rear wheel brakes, the second electronic control unit 3 having one connector 9 corresponding to each of the second input connectors 7. Each of the first input connectors 6 is connected to one of the connectors 8 of the first electronic control unit 2 while each of the second input connectors 7 is connected to one of the connectors 9 of the second electronic control unit 2. Each of the electric brake actuators 1 can independently be supplied either via the respective connector 8 of the first electronic control unit 2 and the first input connector 6 or via the respective connector 9 of the second electronic control unit 3 and the second input connector 7. The connectors 8 are output connectors of the first brake actuation system, the connectors 9 being output connectors of the redundant brake actuation system.

In FIG. 1 and the following Figures, the same or corresponding features are marked using the same reference signs.

Figure 2:
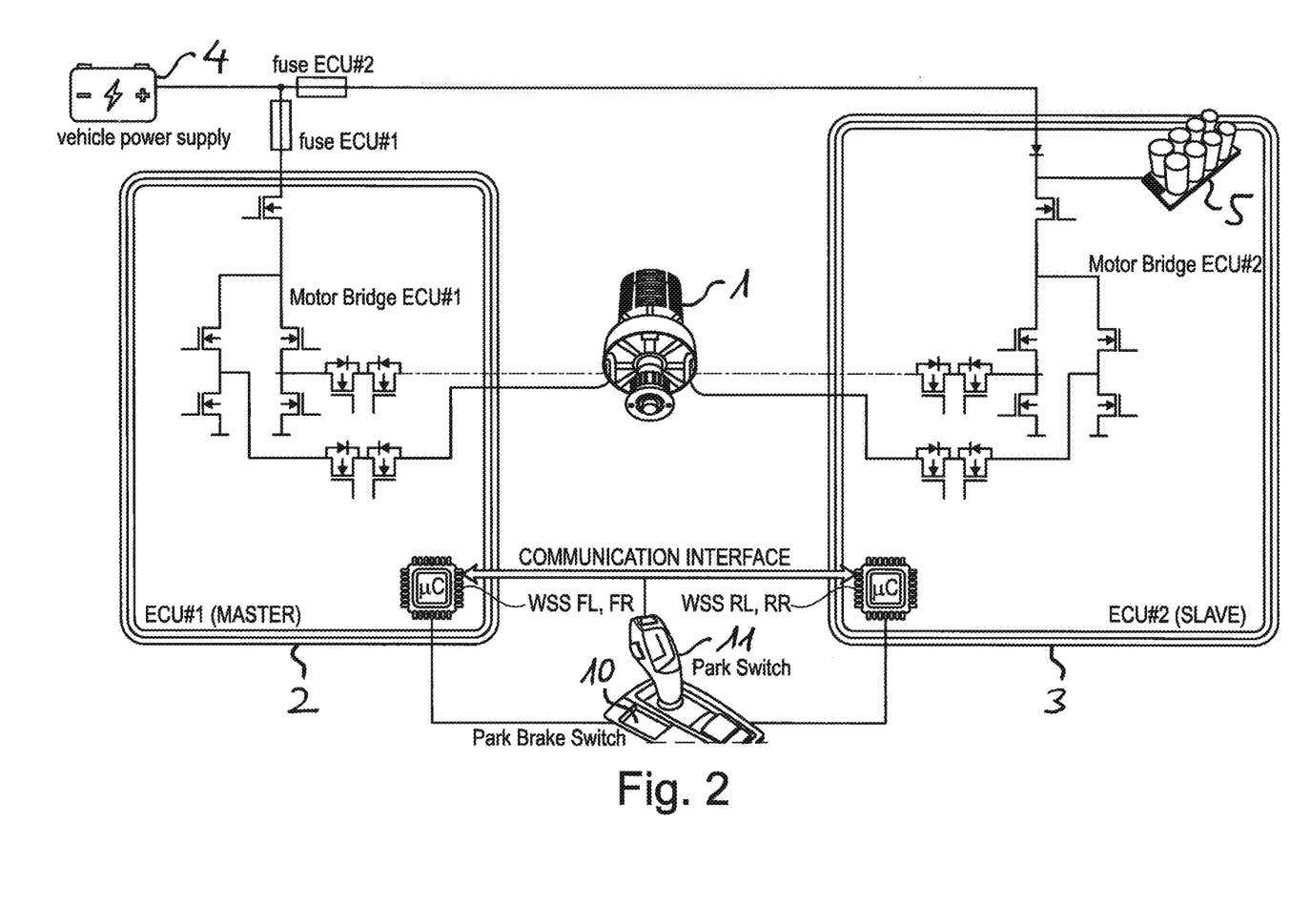
FIG. 2 schematically shows an example of a circuit of a redundant parking brake system (RPBS) of this type having an integrated motor on calliper type actuator.

A circuit of a redundant parking brake system (RPBS) of the type shown in FIG. 1 is illustrated in FIG. 2. In particular, one of the two identical electric brake actuators 1 is shown. It is an integrated motor on calliper type actuator including an electric motor having four brushes and two independent windings. In addition to that, the electric actuator comprises a rotationsal transmission stage and a rotational to linear transmission stage. Each of the two input connectors 6 and 7 are connected to one of the two windings of the electric motor so that each of the windings is connected to one of the input connectors 6 or 7 and, thereby, to one of the first and the second electronic control units 2 and 3. FIG. 2 also shows that the first power supply unit 4 is not only connected to the first electronic control unit 2 but also to the redundant power supply unit 5 contained in the second electronic control unit 3 for charging the second power supply unit 5.

The brake system is configured for self-testing the first brake actuation system given by the first electronic control unit 2 and for self-testing the first power supply unit 4 as well as for activating the redundant brake actuation system given by the second electronic control unit 3 when a failure of the first brake actuation system is detected or when a failure of the first power supply unit 4 is detected. An additional condition for activating the rear wheel brakes by the redundant brake actuation system may be defined as a condition indicating a need of a parking brake action or of a release of the parking brake. Thus, a parking brake function can be controlled not only by a driver operating a park brake switch 10 or a park switch of a selector lever 11 but also by an automated vehicle management system comprising the electronic control units 2 and 3 as well as wheel speed sensors (WSS) associated with each of a left rear wheels (RL), a right rear wheel (RR), a left front wheel (FL) and a right front wheel (FR). Outputs of the wheel speed sensors may be processed independently by each of the first and the second electronic control units 2 and 3.

Figure 3:
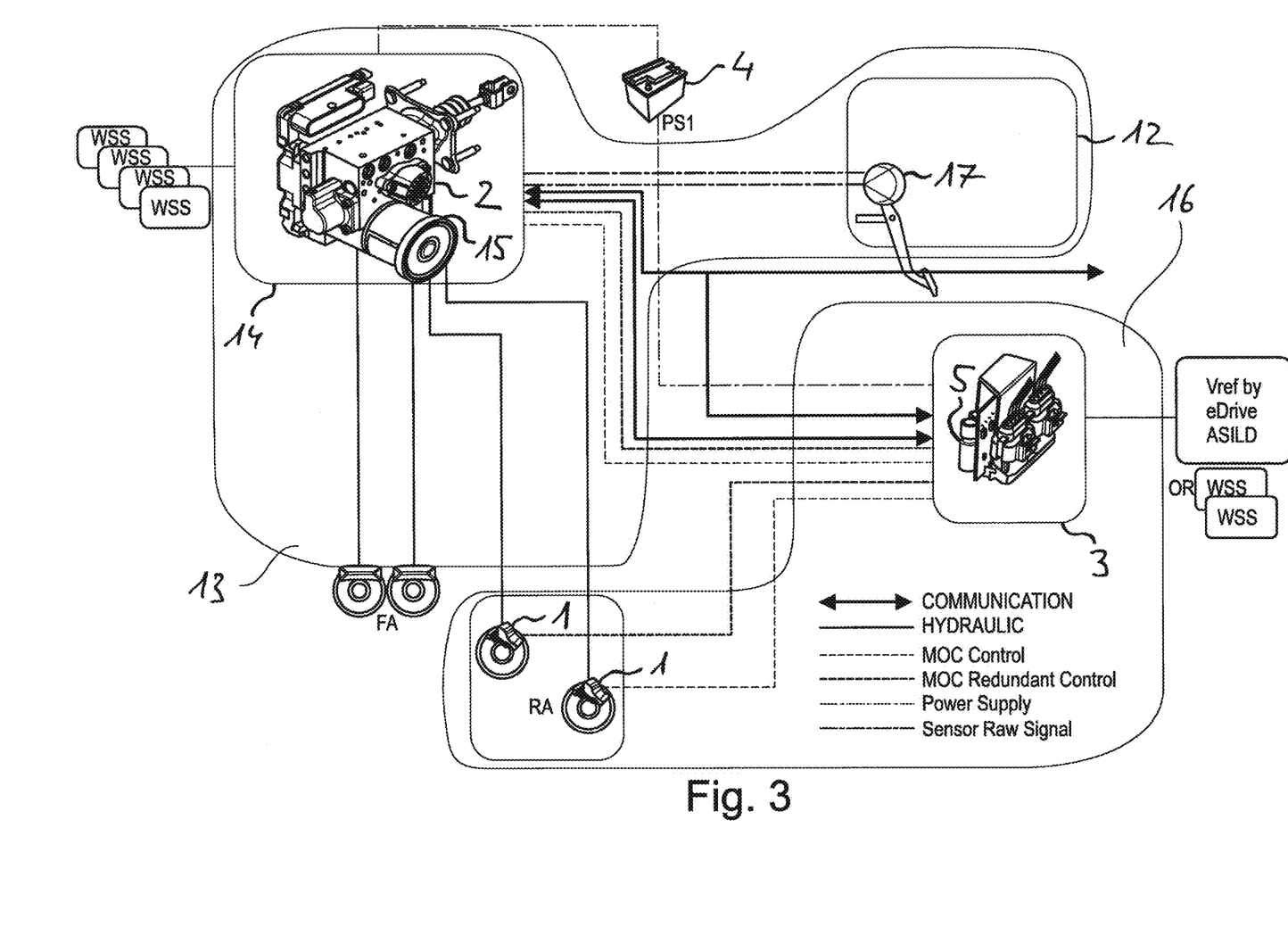
FIG. 3 shows a structure of a brake system including a parking brake system of a similar type.
Figure 4:
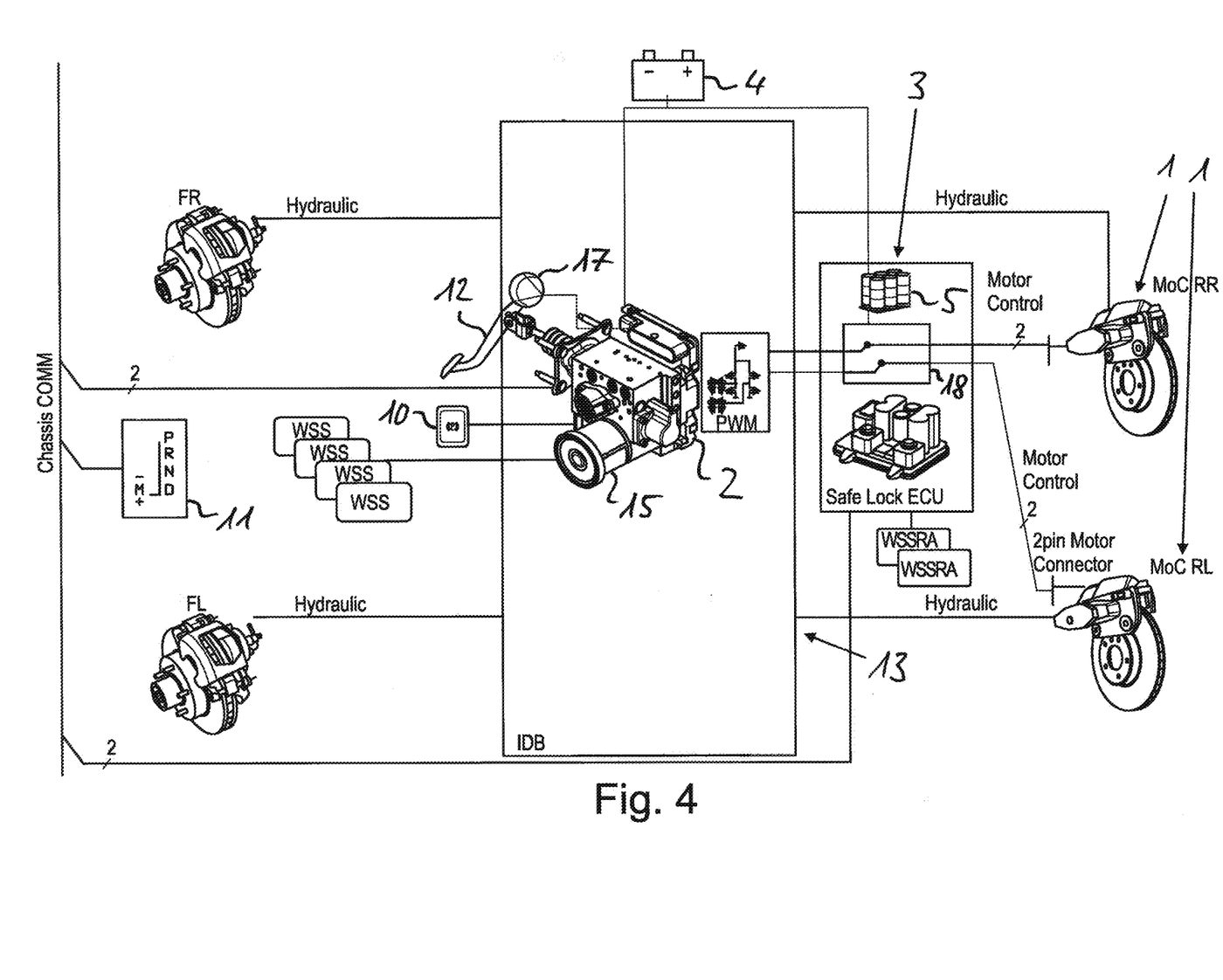
FIG. 4 schematically shows a similar brake system including a hydraulic service brake and an electric parking brake, the electric parking brake including, in addition to a first brake actuation system (as part of an IDB), a redundant brake actuation system (referred to as Safe Lock ECU) for the parking brake with a supercapacitor as a redundant power supply unit.

FIG. 3 illustrates a complete brake system including a hydraulic service brake as well an electrically controlled parking brake system similar to the one described above. The service brake, which can be activated by a brake pedal 12, is an integrated dynamic brake (IDB). A first subsystem 13 of the brake system comprises a primary control unit 14 including the first electronic control unit 2 and a hydraulic actuator 15. Furthermore, the first subsystem 13 comprises the brake pedal 12 and hydraulic lines connecting the hydraulic actuator 15 with four hydraulic brakes, all of them being disc brakes having a calliper. Two of those brakes are hydraulic front wheel brakes of a front axle (FA). The remaining two hydraulic brakes are given by the rear wheel brakes associated with a rear axle (RA). Thus, the rear wheel brakes have, in addition to the electric brake actuators 1, hydraulic brake actuators for activating a service brake function. A second subsystem 16 of the brake system comprises the second electronic control unit 3 including the redundant brake actuation system and the redundant power supply unit 5. The electric brake actuators 1, which are motor on calliper units, are integrated with the hydraulic brake actuators. The hydraulic service brake is activated depending on an output of a pedal sensor 17 of the brake pedal 12 and on sensor signals of the four wheel speed sensors WSS. These sensor signals can also be used as an input of the redundant brake actuation system given by the second electronic control unit 3. The parking brake, which can be operated by the park brake switch 10 or the selector lever 11 as described above, is normally activated by means of the first electronic control unit 2 contained in the primary control unit 14, while this is done independently by the redundant brake actuation system if the first electronic control unit or its power supply fails. An amount of electric energy stored in the supercapacitor being the redundant power supply unit 5 is enough for applying and/or releasing the electric parking brake at least once in case of a failure of the first brake actuation system.

FIGS. 4 to 8 show similar brake systems (or parts thereof) having a redundant brake actuation system (referred to as Safe Lock ECU) in addition to a first brake actuation system, the redundant brake actuation system being configured for activating electric parking brake actuators of two brakes of the brake system in case of a failure of the first brake actuation system (including a possible failure of the battery which is provided as a first power supply unit 4).

In these embodiments, the redundant brake actuation system comprises a switching element 18 (also referred to as Latching Device) connected to the electric brake actuators 1 of the rear wheel brakes, the switching element 18 being configured for alternatively connecting the electric brake actuators 1 either to the first brake actuation system of the first electronic control unit 2 or to a brake actuation circuit of the redundant brake actuation system given by the second control unit 3, so that the first brake actuation system may be connected to the electric brake actuators 1 via the redundant brake actuation system in a normal operating state while the brake actuation circuit of the redundant brake actuation system may be connected to the electric brake actuators 1 for activating the electric brake actuators 1 in case of a failure of the first brake actuation system and/or the first power supply unit 4. In this case, the brake system may be obtained by supplementing a usual brake system including the rear wheel brakes and the first brake actuation system with the redundant brake actuation system and the redundant power supply unit 5 (a supercapacitor contained in the redundant brake actuation system in this case, alternatively a separate smaller battery or the like). In particular, the electric motors of the electric brake actuators 1 may be two brush motors in this case. The Latching Device or switching element 18 is switched to the brake actuation circuit of the Safe Lock ECU or redundant brake actuation system and to the redundant power supply unit 5 not only in case of a failure of the first brake actuation system and/or the first power supply unit 4 but at certain intervals for self-test purposes, for example once in each test cycle.

The redundant brake actuation system may (together with the redundant power supply unit 5 as the case may be) replace a usual parking lock or park pawl as it provides for at least one further parking brake action even if all other components of the parking brake (up to and except the electric brake actuators themselves) fail. The electronic control concept may be designed such that this redundant parking brake action is taken only under certain circumstances indicating the need of activating the parking brake. Such a situation may be detected, for example, using the wheel speed sensors WSS and/or a signal of the park brake switch 10 or the selector lever 11.

Figure 5:
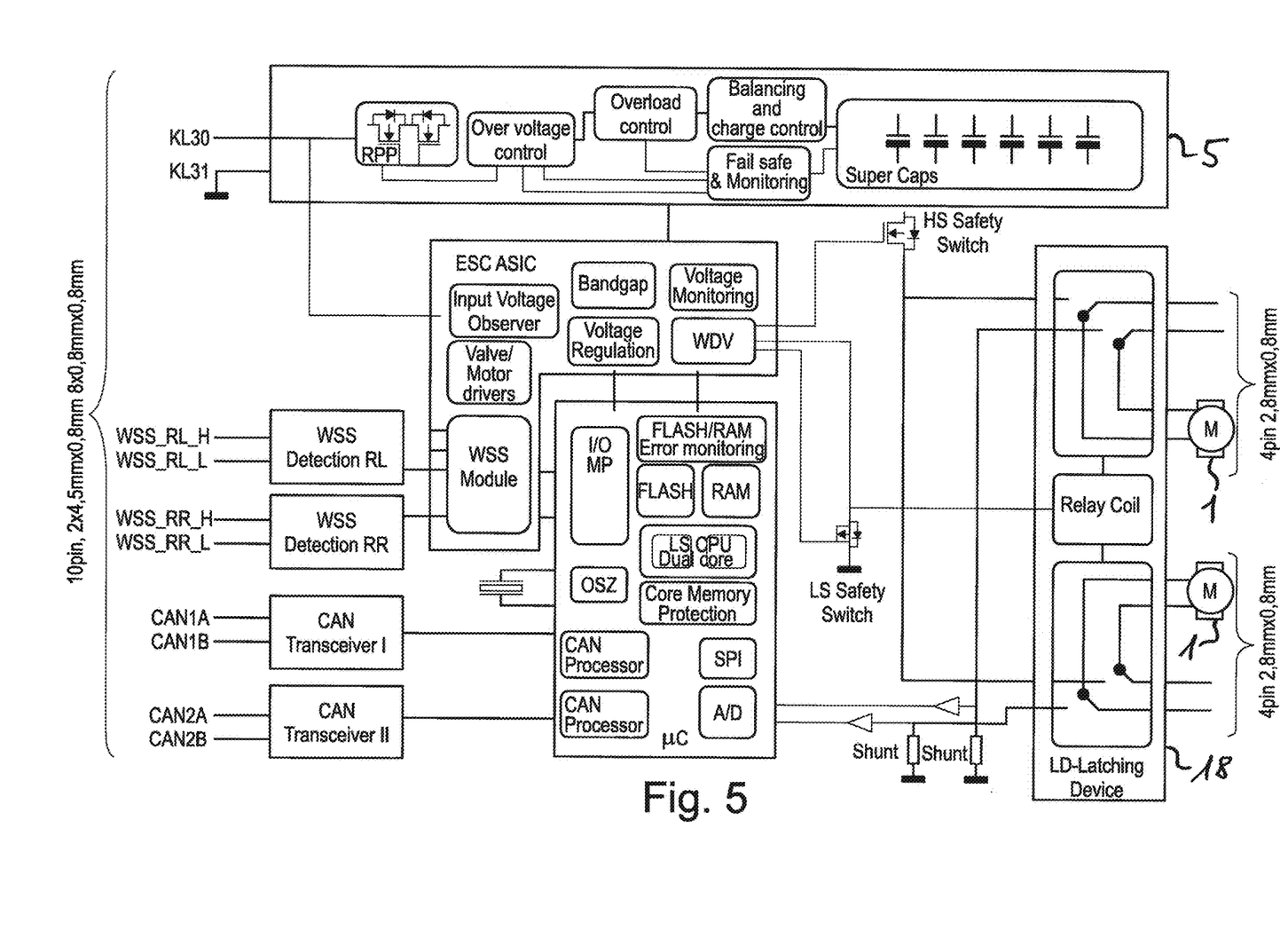
FIG. 5 is a block diagram showing, in an example, a structure of the Safe Lock ECU.

FIG. 5 is a block diagram showing, in an example, a structure of the Safe Lock ECU given by the second electronic control unit 3, an important component being the redundant power supply unit 5 comprising the supercapacitor or several supercapacitors.

Figure 6:
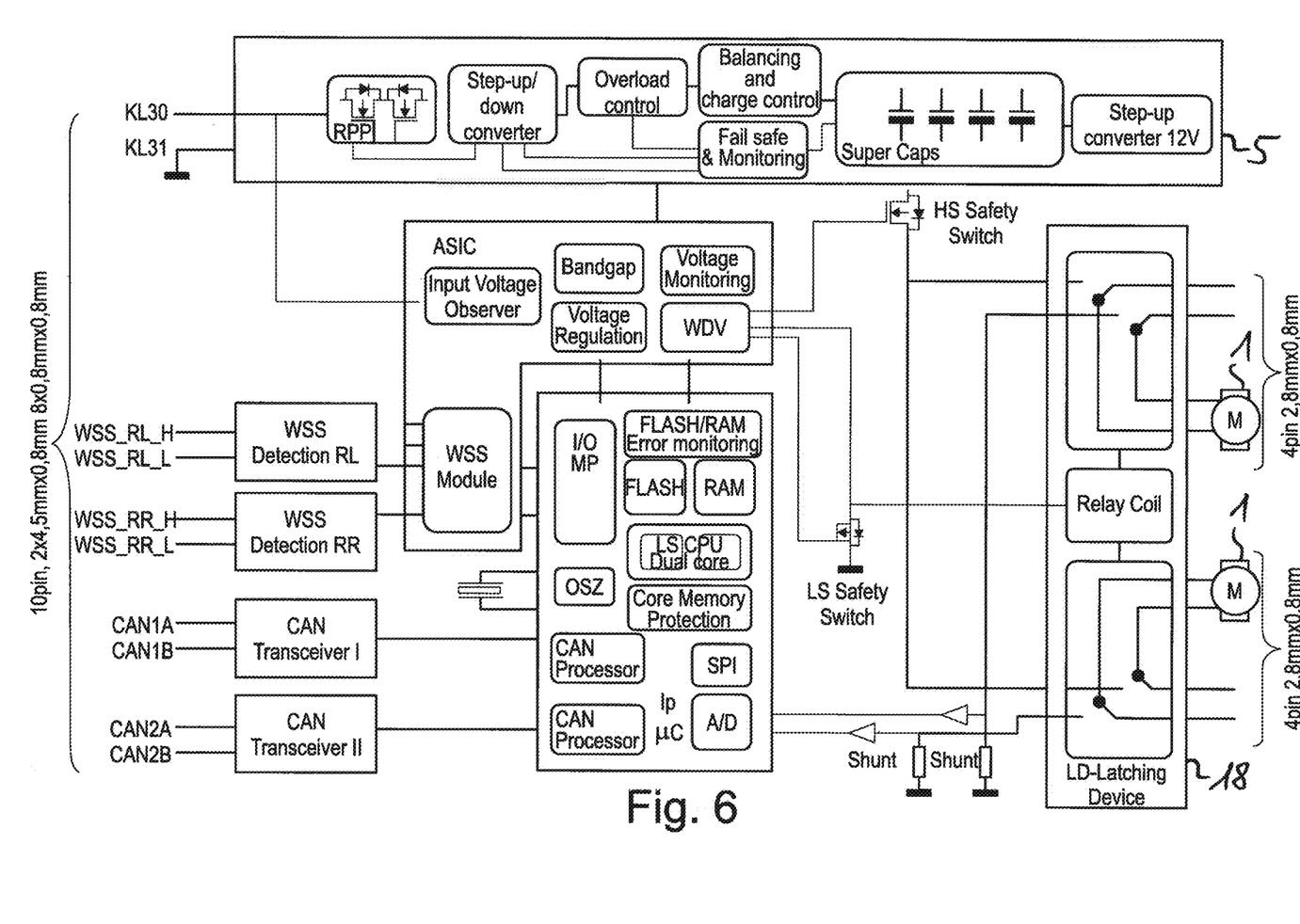
FIG. 6 similarly shows a structure of the Safe Lock ECU in a slightly modified embodiment.

FIG. 6 shows a slightly modified embodiment of the Safe Lock ECU having, in particular, a changed circuitry in the redundant power supply unit 5.

Figure 7:
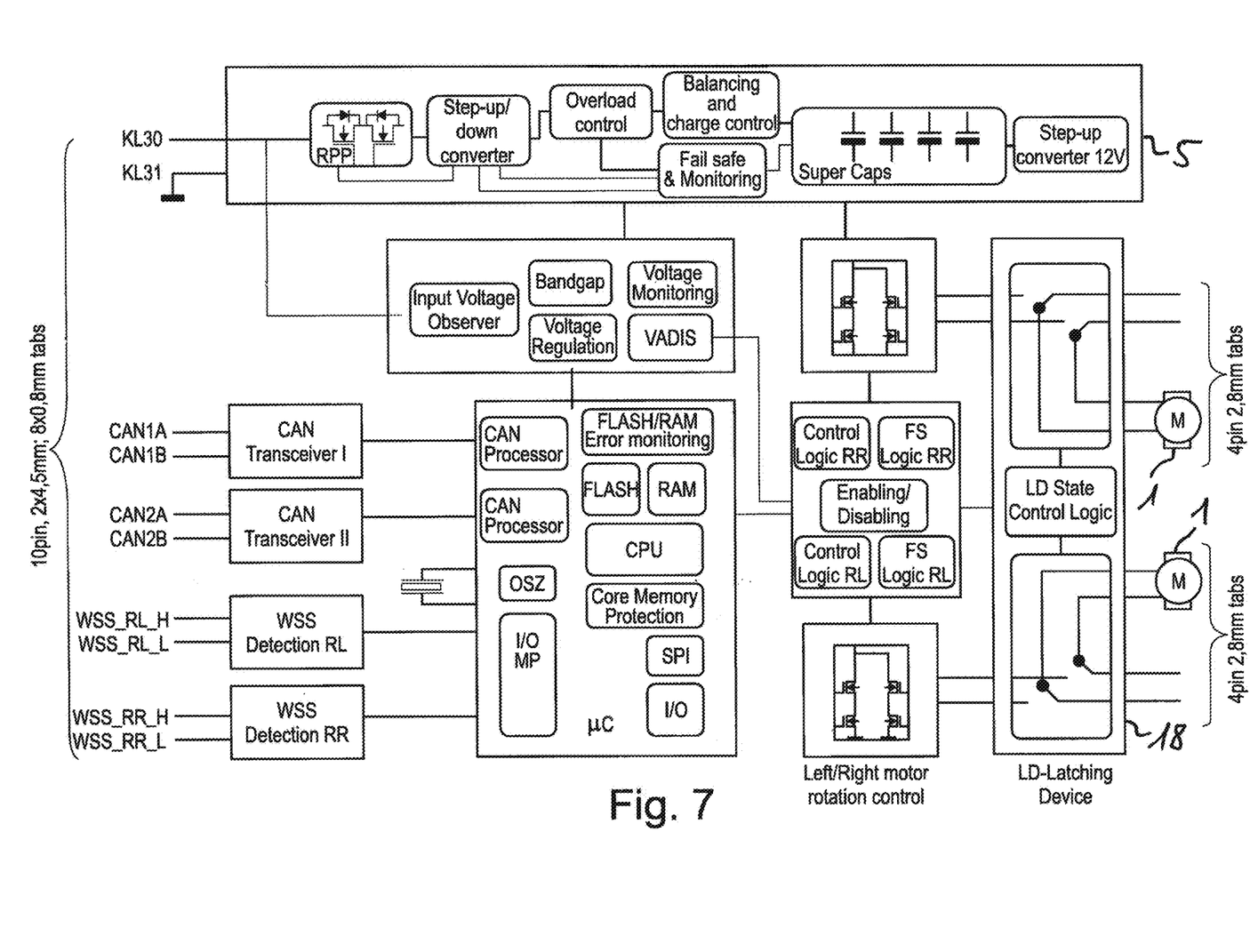
FIG. 7 shows a structure of the Safe Lock ECU in a further embodiment.

A further modification of the Safe Lock ECU is shown in FIG. 7. In this case, the first power supply unit 4 can be used in addition to the redundant power supply unit 5 in case of a partial failure such as a failure of the first brake actuation system or reduced voltage of the first power supply unit 4. An effect of this modification is that the brake system can still be used for a longer period even in case of a failure of the first brake actuation system of the parking brake.

Figure 8:
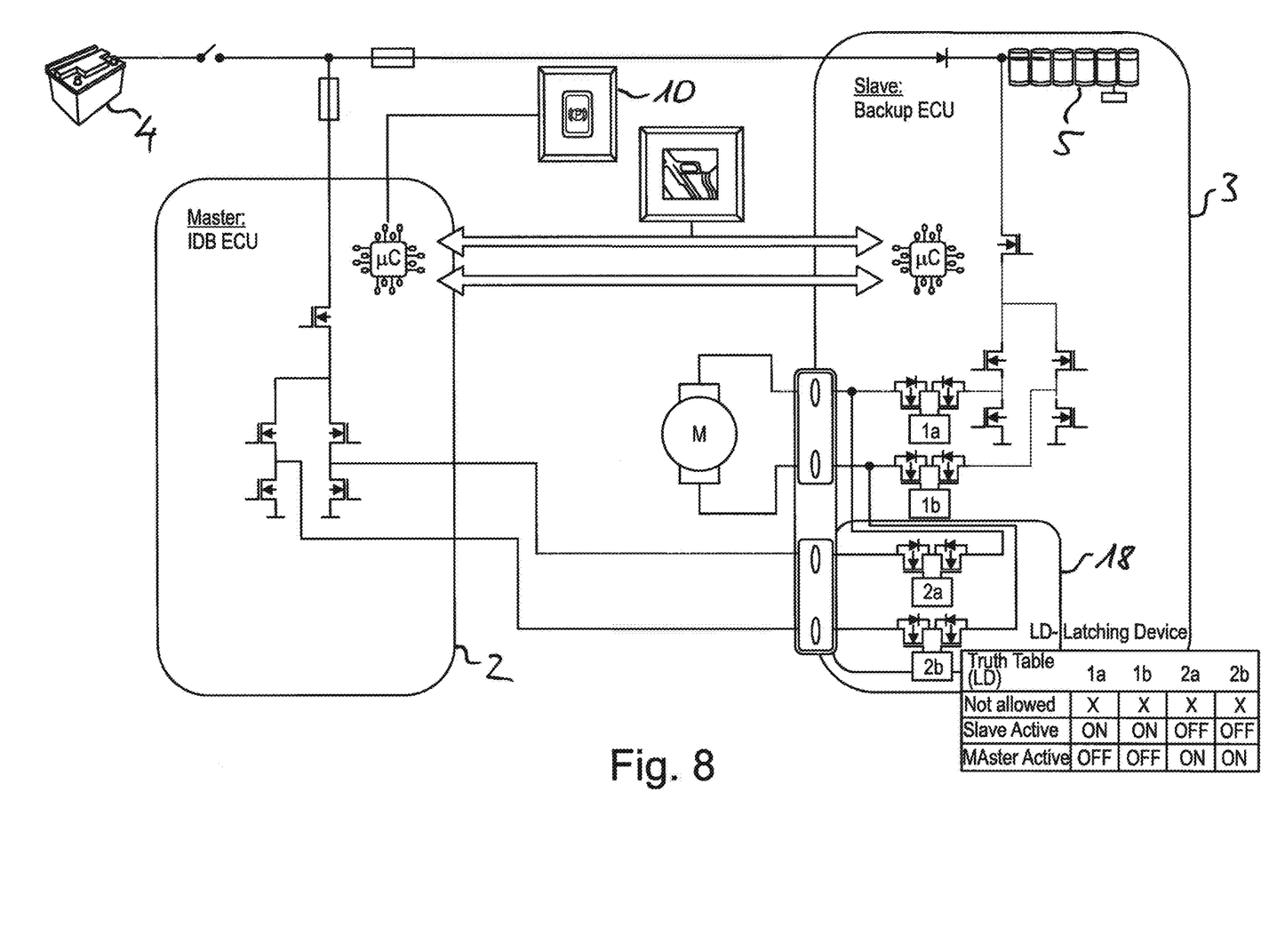
FIG. 8 shows, in an example for one motor (M) as a an electric brake actuator, a diagram illustrating an electronic control concept for a first brake actuation system (referred to as Master or IDB ECU) and a redundant brake actuation system (referred to as Slave or Backup ECU).

FIG. 8 shows an embodiment in which the Latching Device or switching element 18 is given by an electronic circuit instead of a relay unit.

The redundant parking brake system (RPBS) may contain a MoC driving circuit and a logic circuit to control redundant parking brake control. The circuits preferably comply with the ASIL D standard.

In some embodiments, two H-bridge state of the art circuits are used to control the rear right and rear left redundant actuator.

In some embodiments, each separate connection from H-bridge driver circuit to redundant motor is secured by an all pole switch circuit. This is also illustrated in FIG. 2.

In some embodiments, each of the redundant park switches is connected to the redundant parking brake control circuit and can be supplied directly by the redundant power supply unit 5.

The RPBS may be configured to apply the parking brake after an ignition switch is switched off and standstill information is regognized. In particular, the RPBS may be configured for a standstill detection.

In a method for using the RPBS, one or more of the following steps may be performed:
RPBS is receiving wheel speed sensor information
RPBS is calculating vehicle standstill information from at least two wheel speed sensors located at two different wheels
RPBS is receiving vehicle speed sensor information with higher safety integrity level (at least ASIL B)
RPBS is calculating vehicle standstill information from vehicle speed sensor information.

Correspondingly, the RPBS may be configured to receive wheel speed sensor information. It may be configured to receive vehicle speed sensor information with higher safety integrity level (for instance at least ASIL B). The RPBS may be configured for generating a vehicle standstill information from vehicle speed sensor information and/or using at least two wheel speed sensors located at two different wheels.

Furthermore, in a method for using the RPBS, one or more of the following steps may be performed:
RPBS is providing parking brake function controlled by either driver or automated vehicle management system
RPBS is providing vehicle parking function controlled by automated vehicle management system
RPBS is assisting vehicle service brake function controlled by automated vehicle management system
RPBS is assisting vehicle service brake controlled by automated vehicle management system
RPBS can act as a fallback support system for in case of failure of primary service brake system
Main and redundant parking brake control circuit are applying and releasing subsequently to extend brush life time and in general life time of the motor It should be noted that aspects described with respect to the methods shown herein may also be claimed with respect to the brake system and the other way round.

The brake system helps avoiding a dead vehicle situation. The EPB can be released in case of power net failure. Slope parking degradation is avoided. Fall back support on rear axle is provided.

A Purpose of the brake systems described here can be described as follows:
The system is a cost optimized replacement for state of the art additional park pawl mechanisms and parking brake systems.
There should be no need to design park-pawl mechanism in cars with electrical powertrain.
The suggested brake systems have, in particular, the following advantages:
No changes of existing and available parking brake system components are necessary. In particular,
parking brake host HW is not affected at all,
PBC integration in IDB host is still compliant to VDA305-100 so that no change is necessary at all,
there are no additional requirements for MGU/MoC.
A redundancy of parking brake control is realized by one additional Safe Lock ECU. In particular, the following applies:
All necessary system updates in terms of HW and function are incorporated in Safe Lock ECU.
Safe Lock ECU is storing sufficient electrical energy for xy min of standby operation from On Board Power Supply.
During that time frame, one static parking brake apply RL and RR is guaranteed.
Standstill recognition function by sensing RR and RL wheel speed information or/and by external standstill information is possible.
Electronics control circuit ASIL D compliant to prevent unintended wheel lock during driving.
Temporary Energy Buffer Circuit QM,
Safe Lock ECU providing only one stand-alone main function (Last Apply),
Optionally: Safe Lock ECU providing redundant main function with release capability (Apply/Release and Last Apply).

What follows here below is an operation description of at least some of the brake systems disclosed here:
Nominal Operation Mode Apply/Release/Other PBC Functions:
In failure free mode the Safe Lock system operates like state of the art. It reacts either on park brake switch commands or park switch or by receiving external function execution commands via COMM interface according to VDA305-100 standard and/or customer agreed.
Last degradation level operation (DEG_MODE3):
In case of severe single failure of the first subsystem (subsystem 1, comprising the primary parking brake system, EBB) the second subsystem (subsystem 2, comprising the Safe Lock ECU) takes over control. In this mode a last parking brake application will be executed after standstill is detected. To detect failures, the subsystem 2 is passively listening to alive signals from subsystem Ion redundant communication lines.
Subsystem 1:
Subsystem 1 contains EBB (electric brake booster) Module with no change to state of the art in terms of parking brake system operation. In terms of signal exchange between subsystem 1 and subsystem 2 only, modification is necessary. This additional requirement will be added to the host of the subsystem 1.

An additional CAN network for internal redundant parking brake based signal exchange is to be foreseen. Redundant signals like alive signal, parking brake states and standstill information has to be provided from subsystem 1 to subsystem 2.

Subsystem 2:

Subsystem 2 contains the Safe Lock ECU which supplements the state of the art parking brake system. It allows elimination of the usual park pawl by guaranteeing the right level of the parking brake system availability over vehicle life time.

Safe Lock System Failure Detection (for Last_Apply_Subsystem2—DEG_MODE3):

Detection Parameters:
  Passive monitoring of Alive_Counter_Subsystem1 on redundant CAN channels
  Passive monitoring of Park_Brake_Status_Subsystem1 on redundant CAN channels
  Monitoring of ParkRequest_Information
  Monitoring of PowerGood_Terminal_Subsystem1
  Can Timeout Plausibility Check:
  For plausibility validate Park_Brake_Status_Subsystem1 with Alive_Counter_Subsystem1 signal (on redundant CAN channels)

Action on Detected Failure:
Conditional Execution of Last_Apply_Subsystem2 Based on Failure Modes:
  Failure_Mode 1: Subsystem1 malfunction: indicated by Park_Brake_Status_Subsystem1
  Failure_Mode 2: Loss of Power Supply indicated by CAN timeout & PowerGood_Terminal_Subsystem1
  If Failure_Mode 1 has been detected Last_Apply_Subsystem1 will be executed on next Park Request indicated by ParkRequest_Information.
  If Failure_Mode 1 has been detected Last_Apply_Subsystem1 will be executed after next vehicle standstill after confirmation by driver (P-Switch) or latest IGN off.

Additional Conditions: Valid Standstill Information from Subsystem 2

Last_Apply_Subsystem2 Function Description:
  Once triggered, this function is locking the corresponding wheels by applying the maximum defined clamping force.

Standstill Verification Method Before Execution of Last_Apply_Subsystem2:
  To prevent loss of vehicle stability situation by locked RA wheels, the standstill detection for the vehicle is provided within the Safe Lock ECU.

To ensure a proper operation of the whole control path consisting of energy storage, Latching Device and the connected MoC actuators (i.e. the electric brake actuators 1), a diagnostic (self-test) routine is implemented.

Tested Subsystems of Subsystem 2 are, in Particular, the Following:
  a power flow and nominal operation of electrical energy storage
  HS switch
  Control modules
  Latching Device (LD)
  Monitoring circuits of load current A test method may be a pre-run diagnostic operation and/or a post-run diagnostic operation. To keep necessary changes to subsystem1 as marginal as possible, the the post-run diagnostic operation is preferred.

Pre-Run Diagnostic Operation Description:
To ensure that a latent failure of subsystem 2 is not probable during a vehicle operation, a self-test at the beginning of ignition (IGN) run cycle can be provided. In this case, the diagnosis shall be made in following sequence:

1. After wake-up command for subsystem1 and subsystem2 has been issued and parking brake is applied and no driver park release command is recognized, subsystem1 shall enable self-test by indicating it with Test_Enable qualifier on redundant communication interface.
2. Subsystem 2 disconnects from KL30 voltage input terminal
3. Subsystem 2 switches LD for about 1 s active
4. Subsystem 2 switches HS for t<about 0.3 s on
5. Subsystem 2 measures current shape and responding capacitor voltage negative gradient $V_G=f(I_c)$ and compare with limits
6. Possible interruption of test routine: In case of toggling of Test_Enable signal on communication interface ongoing test shall be aborted in case if remaining time of ongoing test sequence longer than 2 s and repeated at next possible sequence.
7. Completed test will lead to positive or negative result: In case of positive test result control logic will switch MD off first and second LD to position subsystem 1 connected to MoC. Subsequently, subsystem2 enters standby operation mode.
8. In case of negative result, the test sequence shall be repeated three times after a waiting period of 1 s in each case. If the result after last attempt is still negative, diagnoses will detect failure mode of subsystem 2 and return DTC. Last_Apply_Subsystem2 function (DEG_MODE3) will remain disabled in this case.
9. After subsequent system wake-up stored DTC will lead to activated Subsystem2_Defect signal forcing Safe Lock system to enter DEG_MODE2.

Post—Run Diagnostic Operation Description:
LD device to switch from Subsystem 2(EBB) to Subsystem 1. with High Side switch off.

Condition for self-test: subsystem 1 has applied and has entered sleep mode.

Diagnosis Shall Run in Following Sequence:
1. Subsystem 2 disconnects from KL30 voltage input terminal
2. Subsystem 2 switches LD for about 1 s active.
3. Subsystem 2 switches HS for t<about 0.3 s on
4. Subsystem 2 measures current shape and responding capacitor voltage negative gradient $V_G=f(I_c)$ and compare with limits
5. Possible interruption of test routine: In case of receiving wake-up signal on communication interface ongoing test shall be aborted in case if remaining time of ongoing test sequence longer than 2 sec and repeated at next possible sequence.
6. Retriggering on wake-up signal: In case of receiving wake-up signal over communication interface during ongoing test Subsystem2 shall not enter sleep mode
7. Otherwise completed test will lead to positive or negative result: In case of positive test result control logic will switch MD off first and second LD to position Subsystem 1 connected to MoC. Subsequently Subsystem2 goes to sleep mode.
8. In case of negative result test sequence will be repeated 3 times after waiting period of 1s each. If result after last attempt is still negative diagnoses will detect failure mode of Subsystem 2 and return DTC. Last_Apply_Subsystem2 function (DEG_MODE3) will remain disabled in this case.

9. After subsequent system wake-up stored DTC will lead to activated Subsystem2_Defect signal forcing Safe Lock System to enter DEG_MODE2.

Not fully tested functions of subsystem 2 at the beginning of the next IGN-cycle are the switching capability of LD and load current draw. This is indirectly tested by test current pulses into a relay coil and a voltage gradient caused by an inrush current detected when loading up the capacitor bank (the supercapacitors) from a battery voltage level to fully loaded voltage level.

The invention claimed is:

1. A brake system, comprising:
   at least one brake with an electric brake actuator and associated with a wheel installed on one axle;
   at least one electronic control unit for controlling the at least one brake, the at least one electronic control unit comprising a first brake actuation system for activating the electric brake actuator and a redundant brake actuation system for activating the electric brake actuator in case of a failure of the first brake actuation system;
   a first power supply unit; and
   a redundant power supply unit, the redundant power supply unit being an independent power source different from the first power supply unit and being or comprising an energy storage having a smaller capacity than the first power supply unit,
   wherein the first power supply unit and the redundant power supply unit are connected to or integrated in the at least one electronic control unit and configured for supplying energy to the electric brake actuator, the first power supply unit being connected to the first brake actuation system for supplying energy to the first brake actuation system and via the first brake actuation system to the electric brake actuator, the redundant power supply unit being connected to or integrated in the redundant brake actuation system for supplying energy to the redundant brake actuation system and via the redundant brake actuation system to the electric brake actuator,
   wherein the redundant brake actuation system comprises a switching element connected to the electric brake actuator of the at least one brake, the switching element being connected for alternatively connecting the electric brake actuator either to the first brake actuation system or to a brake actuation circuit of the redundant brake actuation system, and
   wherein the redundant brake actuation system comprising the switching element is connected between the electric brake actuator and the first brake actuation system including a hydraulic actuator, a first terminal of the switching element of the redundant brake actuation system is connected to the first brake actuation system including the hydraulic actuator and a second terminal of the switching element of the redundant brake actuation system is connected to the electric brake actuator.

2. The brake system of claim 1, wherein the electric brake actuator is a parking brake actuator and/or the at least one brake further comprises a hydraulic brake actuator for activating a service brake function of the at least one brake.

3. The brake system of claim 1, wherein the first power supply unit is a battery and the redundant power supply unit is a further battery or a supercapacitor.

4. The brake system of claim 3, wherein the first power supply unit is connected to the redundant power supply unit for charging the redundant power supply unit.

5. The brake system of claim 1, wherein the switching element of the redundant brake actuation system further comprises a third terminal connected to the brake actuation circuit of the redundant brake actuation system.

6. The brake system of claim 1, wherein the at least one brake has two input connectors and the at least one electronic control unit has at least two connectors, wherein each of the two input connectors is connected to, in each case, one of the at least two connectors of the at least one electronic control unit, the at least one brake being configured to be supplied via either of the two connectors, independently.

7. The brake system of claim 6, wherein the first brake actuation system has a first connector of the at least two connectors, which is connected to a first input connector of the two input connectors, and the redundant brake actuation system has a second connector of the at least two connectors, which is connected to a second input connector of the two input connectors.

8. The brake system of claim 1, wherein the first brake actuation system and the redundant brake actuation system are arranged in one common housing or in separate housings.

9. The brake system of claim 1, wherein the at least one brake is a disc brake comprising a calliper, the electric brake actuator being designed as a motor on calliper unit.

10. The brake system of claim 1, wherein the brake system is configured to self-test the first power supply unit to activate the redundant brake actuation system when a failure of the first power supply unit is detected.

11. Method for using the brake system according to claim 1, wherein providing a parking brake function or a service brake function is controlled either by a driver or by an automated vehicle management system.

12. The brake system of claim 1, wherein the first brake actuation system and the redundant brake actuation system are installed in different electronic controller units.

13. The brake system of claim 1, wherein the at least one brake has two input connectors, and the first brake actuation system has a first connector connected to one of the two input connectors of the at least one brake and the redundant brake actuation system has a second connector connected to another of the two input connectors of the at least one brake.

* * * * *